Patented Aug. 21, 1951

2,564,738

UNITED STATES PATENT OFFICE 2,564,738

METHOD OF FORMING A VACUUM-TIGHT BOND BETWEEN CERAMICS AND METALS

Franz Tank, Zurich, Switzerland, assignor to Gesellschaft zur Förderung der Forschung an der Eidg. Technischen Hochschule, Zurich, Zurich, Switzerland, a firm of Switzerland No Drawing. Application July 2, 1947, Serial No. 758,704. In Switzerland February 25, 1947

7 Claims. (Cl. 29—179.5)

It is well-known that the glass hitherto used in the construction of thermionic valves is not suitable for use with extremely short waves and must be replaced by a di-electric capable of supporting a higher electric stress. Those ceramics which term, as used herein, refers to burned refractory ware and excludes vitreous materials like glass generally employed as insulators in cases where the H. F. current losses are to be kept as low as possible, possess electric properties in considerable measure superior to glass, but their vacuum-tight combination with metals is difficult to effect. For such reason ceramics have as yet not been introduced in the manufacture of valves for ultra-short waves.

Two methods are known for the vacuum-tight bonding of non-vitreous ceramics and glass to metal. First, it has been proposed to utilize an intermediate layer of glass or of vitreous enamel as a binding agent. This method has a serious disadvantage, inasmuch as the plasticity of the glass or the enamel hinders the maintenance of exact measurements. Furthermore the unsatisfactory electric properties of the binding material exert an unfavourable influence on the bonded product and increase the total losses. As the method offers only comparatively small advantages in comparison to the ordinary glass-metal seal, it has not been adopted in practice. Secondly, it has been proposed to metallize the non-vitreous ceramic material, and subsequently to braze the piece of metal onto the metallized surface. Several methods are available for covering ceramics with metal. A film of precious metals can be burnt in, or a covering can be obtained by aid of the metal-spraying process and furthermore by sintering a metal powder. A burnt-in film of precious metal is too thin to allow brazing and for such reason not practicable. The metal coverings obtained by the other methods require special fixtures for brazing and thereby become complicated. This explains the fact that they are not used in practice.

The present invention relates to a new method for obtaining vacuum-tight, firm combinations between non-vitreous ceramics and metals. The new process is very simple in comparison to the methods hitherto proposed and known. The process according to the invention is substantially characterized thereby, that the metal and the ceramic are pressed together at an elevated temperature. The temperatures and pressures employed must both be sufficiently high to effect a plastic deformation of the metal and thereby to produce a close adaptation of the metal surface to the ceramic surface, but care must be taken to avoid temperatures and pressures so high as to exert a deleterious or destructive effect on the materials employed.

As a result of protracted experiments the remarkable fact was discovered, that ceramic materials can be firmly and vacuum-tightly connected to metals in a very simple manner by pressing the ceramic and the metal together at an elevated temperature. Numerous experiments showed that temperatures and pressures can be varied within comparatively wide limits without affecting the object of the invention.

The lower limit of the temperatures and pressures to be employed is determined by the conditions under which the metal becomes practically deformable.

The investigations furthermore showed the importance of the time factor for achieving connections of good quality between the two different materials. Ceramic and metal must be pressed together for a certain time to provide satisfactory results, and increased working temperatures and pressures reduce the necessary duration of the pressing operation. In practice the time requirements of particular materials are ascertained in each individual case, and furthermore what temperatures and pressures are to be used for obtaining satisfactory results within an economical space of time. Further factors exert an influence on the time requirement: first, the condition of the metal surfaces, e. g., blank or oxidized; secondly, the conditions in the heating chamber, i. e. vacuum, gas atmosphere etc. The following examples illustrate the manner in which the process according to the invention can be carried out.

Example 1

For the combination of copper and (burned) steatite the lowest temperatures and pressures that supply satisfactory results are approximately 800° C. and 50 kg./cm.$^2$ (700 lbs./sq. inch). A copper plate was heated and reduced in a hydrogen atmosphere at 900° C. for 30 minutes. The combination was effected in a nitrogen atmosphere completely free of all traces of oxygen. The two materials were pressed together for one hour, employing a pressure of 210 kg./cm.$^2$ (3000 lbs./sq. inch) and a temperature of 1000° C. The combination supported higher stresses than the individual materials. A tensile test showed fracture in the steatite.

Example 2

The surface of the copper was not blank, but covered with cupric oxide. By heating the copper to redness and subsequent dipping into water the cupric oxide layer was converted into cuprous oxide. Working at the same temperature and pressure as in Example 1 a combination was obtained within only a few seconds, that showed a higher tensile strength than the steatite itself.

*Example 3*

For connecting chrome steel and (burned) steatite the lowest practicable working temperature is about 1000° C. and the corresponding pressure approx. 50 kg./cm.$^2$ (710 lbs./sq. inch). The clean metal was pressed onto the steatite at a temperature of 1100° C. with a pressure amounting to 200 kg./cm.$^2$ (2800 lbs./sq. inch) in a vacuum. Within 30 minutes a combination was achieved with a better tensile strength than that of the steatite.

*Example 4*

Employing the same temperatures and pressures as in Example 1 the polished metal (chrome steel) was pressed onto the steatite in a nitrogen atmosphere. The course of the reactions was slower than in Example 3. The tensile strength of the connection increased with the duration of the treatment.

The examples given show that both temperature and pressure and also other working conditions, such as state of the surfaces can be varied without affecting the efficiency of the process according to the invention. Such factors only exert an influence on the tensile strength of the connections and the reaction times.

The method according to the invention is not only suitable for the combination of (burned) steatite with copper or with chrome steel, but can generally be applied to such metals as silver, chromium, nickel, molybdenum, tungsten, platinum, aluminium etc., and to other ceramics than steatite. According to the materials to be employed the most favourable working conditions must be determined in each single case before the process according to the invention is applied to mass production. The necessary experiments can be made in the laboratory by helpers, as they require no specialized training.

The method and process according to the invention provides the possibility of employing ceramics in the construction of thermionic valves for ultra-short waves. It is of course possible to make radial thru leads with suitable plates such as are required in the construction of the Klystron and also the Reflexion-Klystron. The field between the electrodes only leads to losses in the ceramic and for such reason they can be reduced to one-tenth by the employment of known special ceramics in place of the types of glass used at present. The numerous experiments carried out have proved that the metal-ceramic combination possesses a high temperature resistance, whereby the method according to the invention is also suitable for thru leads of high performance apparatus, such as transmitter valves, mercury vapour rectifiers (without pumps) etc.

I claim:

1. Process for the vacuum-tight, firm combination of non-vitreous ceramics and metals, wherein the metal and the ceramic are pressed together at an elevated temperature in such manner that the actual working temperatures and pressures are at least sufficiently high to effect a plastic deformation of the metal and thereby to produce a close adaptation of the metal surface to the ceramic surface, but also sufficiently low to avoid a deleterious or destructive effect on the materials.

2. Process according to claim 1 wherein copper is connected to burned steatite employing a temperature of at least 800° C. and a pressure of at least 50 kg./cm.$^2$.

3. Process according to claim 2 wherein copper is combined with burned steatite at a working temperature of approximately 1000° C. and a pressure of approximately 210 kg./cm.$^2$ in such manner that the copper is supplied with a coating of cuprous oxide and then submitted to a pressing operation together with the ceramic lasting at least some seconds.

4. Process according to claim 1, wherein chrome steel is combined with burned steatite employing a temperature of at least 1000° C. and a pressure of at least 50 kg./cm.$^2$.

5. Process according to claim 1, wherein chrome steel is combined with burned steatite employing a temperature of approximately 1100° C. and a pressure of approximately 200 kg./cm.$^2$ in such manner that the cleaned surface of the chrome-steel is pressed against the steatite in a vacuum for at least 30 minutes.

6. Process for connecting burned steatite and copper in vacuum-tight fashion, comprising pressing together the steatite and copper articles at a pressure of approximately 210 kg./cm.$^2$ and at a temperature of about 1000° C. to effect plastic flow of the copper until it adheres strongly and continuously to the steatite.

7. Process according to claim 6 wherein the copper article is provided with a cuprous oxide film before being pressed against the steatite.

FRANZ TANK.

REFERENCES CITED

The following references are of record in the file of this patent:

UNITED STATES PATENTS

| Number | Name | Date |
|---|---|---|
| 1,627,780 | Jonas | May 10, 1927 |
| 1,727,755 | Dickinson | Sept. 10, 1929 |
| 2,094,287 | Zimmerman et al. | Sept. 28, 1937 |
| 2,180,992 | Meyers, Jr. | Nov. 21, 1939 |
| 2,198,769 | Goodale | Apr. 30, 1940 |
| 2,248,415 | Schwartzwalder et al. | July 8, 1941 |
| 2,355,443 | Jeffery | Aug. 8, 1944 |
| 2,406,401 | Richardson | Aug. 27, 1946 |
| 2,422,628 | McCarthy | June 17, 1947 |
| 2,450,130 | Gordon | Sept. 28, 1948 |

OTHER REFERENCES

Ency. of Ceramic Indust. by Searle, 1929, Pub. Ernest Benn, Ltd., London, vol. 1, pp. 184–185 and vol. 3, pp. 212–213. (Copies in Div. 15.)